United States Patent [19]
Yokota

[11] Patent Number: 4,658,431
[45] Date of Patent: Apr. 14, 1987

[54] STAR SENSOR USING CCD
[75] Inventor: Toyohachi Yokota, Tokyo, Japan
[73] Assignee: NEC Corporation, Japan
[21] Appl. No.: 634,076
[22] Filed: Jul. 25, 1984
[30] Foreign Application Priority Data Jul. 26, 1983 [JP] Japan ................. 58-136123

[51] Int. Cl.[4] ............................ G06K 9/38
[52] U.S. Cl. ........................... 382/53; 382/68; 358/103
[58] Field of Search ............ 382/53, 68, 66; 358/126, 103, 211; 250/203 R

[56] References Cited
U.S. PATENT DOCUMENTS 3,985,446 10/1976 Feldman et al. .............. 358/211
4,227,212 10/1980 Woolfson et al. ............. 358/126
4,351,004 9/1982 Choate et al. ................ 382/53
4,499,497 2/1985 Levine ........................ 358/211

OTHER PUBLICATIONS
Article by G. Borghi et al entitled "Star Detection and Tracking Using CCDs".

Primary Examiner—Anthony V. Ciarlante
Attorney, Agent, or Firm—Ostrolenk, Faber, Gerb & Soffen

[57] ABSTRACT

A star sensor which includes a charge-coupled device (CCD) for detecting light rays of a star and for producing an output representative of the distribution of the light rays of the star over the CCD. The CCD output is filtered and a detecting circuit is used for finding the points where the output signal voltage of the filter equals a predetermined level. A computing circuit compares the output of the detecting circuit to a reference voltage to locate peak values of the CCD signal. A data processor uses the generated outputs which correspond to the peak values to calculate the brightness and position of the star.

16 Claims, 28 Drawing Figures

STAR SENSOR USING CCD

BACKGROUND OF THE INVENTION

The present invention relates to a star sensor for use in the attitude control of satellites and, more particularly, to a star sensor using a charge-coupled device (CCD) in its star imaging array.

In one of the conventional techniques of using a CCD, the output of the CCD, after being amplified, is applied to a sample-and-hold circuit for voltage retention. The sustained voltage is then compared with a reference voltage by a voltage comparator. This reference voltage corresponds to the star magnitude, and the sustained voltage, if found to be above the reference voltage, is subjected to analogdigital conversion and supplied to a dataprocessing circuit. At the same time, the picture element (pel) position information (i.e., the coordinates of the star) at this moment is supplied from a coordinate counter, which counts the clock pulses outputted from the CCD driving circuit, to the data processing circuit. The latter circuit stores in a buffer memory the CCD output voltage thereby obtained, which is not below the reference voltage, and its positional information with respect to every pel on the CCD. Then, its picks out the highest among the stored voltages and determines the central position of the star on that basis.

Since all the data regarding the pels which exceed the reference value are stored, the conventional star sensor requires a large-capacity buffer memory, which is costly to manufacture and results in added weight. Furthermore, background light rays entering uniformly into the optical system tend to be sensed and affect star image signals adversely, depending on how high the reference voltage of the voltage comparator is set.

Star sensors using CCDs are described in G. Borghi et al, "STAR DETECTION AND TRACKING USING CCDs", *IFAC Automatic Control in Space*, 1982, pp. 263 to 269. The proposed star sensor has a star search mode and a star track mode, and has a great advantage in accuracy, but it does have the following problems: it is complex in circuitry because it requires two sets of hardware, one for the search mode and the other for the track mode, and also involves the need for different software arrangements for the two modes. Furthermore, this paper in no way touches on the resolution of background light.

SUMMARY OF THE INVENTION

An object of the present invention, therefore, is to provide a CCD-based star sensor which requires a buffer memory of small capacity.

Another object of the invention is to provide a CCD-based star sensor capable of accurately determining the central position of the stage image even if background light rays overlap into the star image signals.

According to the invention, there is provided a star sensor comprising: charge-coupled device (CCD) means for detecting the light rays of a star; means for filtering the outputs of the CCD means; means for detecting the point where the voltage of the output of the filtering means is equal to a predetermined level; and means responsive to the output of the detecting means and of the CCD means for computing the brightness and position of the star.

BRIEF DESCRIPTION OF DRAWINGS

Other objects, features and advantages of the present invention will become more apparent from the detailed description hereunder taken in conjunction with the accompanying drawings, wherein.

DETAILED DESCRIPTION OF PREFERRED EMBODIMENTS

Figure 1:
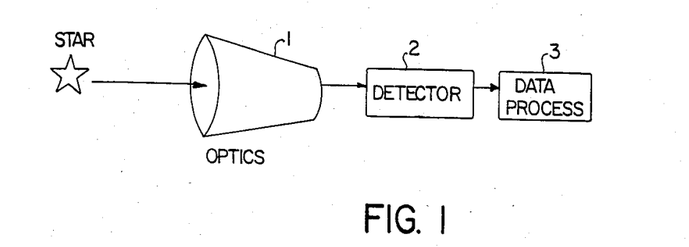
FIG. 1 is a schematic block diagram of a star sensor according to the invention.
Figure 2:
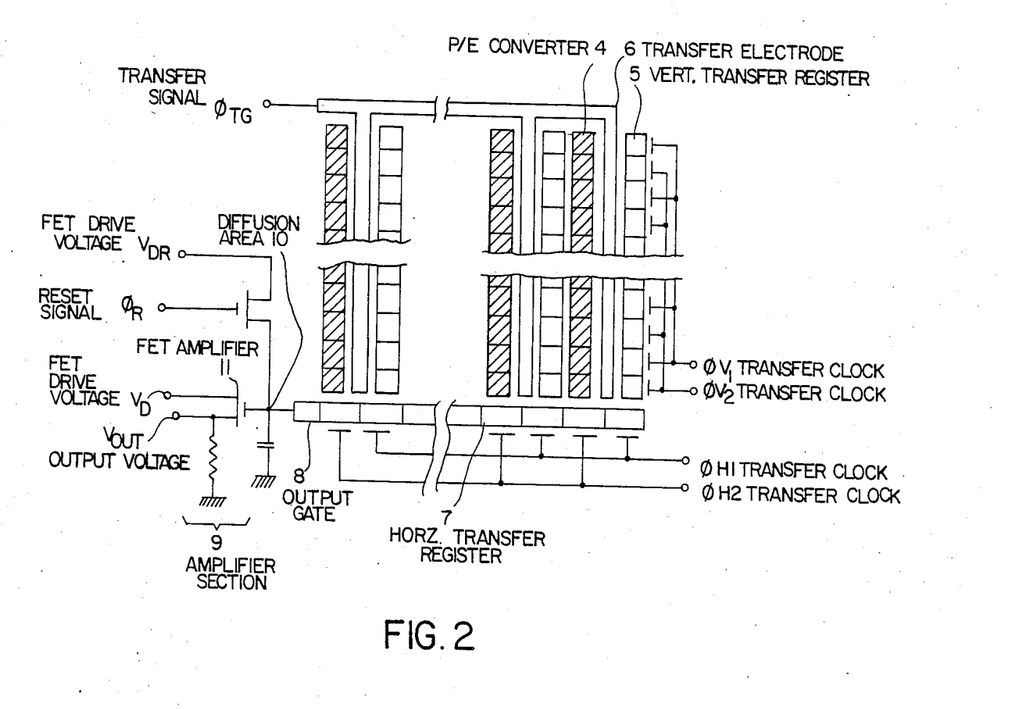
FIG. 2 outlines the composition of a CCD contained in the detector of the star sensor shown in FIG. 1.

Referring to FIG. 1, an optical element 1 focuses rays of light from a star, and supplies them to a detector section 2. Detector section 2 converts the focused light rays into a focused star image signal, and supplies it to a data processing circuit 3. On the basis of the supplied data, the circuit 3 calculates the brighness and position of the star. The result of this calculation enables the determination and control of the attitude of the satellite.

To facilitate understanding of the present invention, the operation of a CCD will be briefly explained with reference to FIGS. 2 and 3A to 3K before describing the invention in more detail. The CCD illustrated in FIG. 2 comprises a photoelectric converter section 4 including a plurality of columns of CCD's for converting light rays into an electric charge corresponding to the intensity of the light rays and for storing the charge. A transfer electrode 6 transfers the charge thus developed at section 4 to a vertical transfer register 5 in response to a transfer signal $\phi_{TG}$. The charge stored in the transfer electrode 6 is then transferred to a horizontal transfer register 7 in response to transfer clock pulses $\phi_{V1}$ and $\phi_{V2}$. The charge fed from the horizontal transfer register 7 is provided to an output gate 8 in response to transfer clock pulses $\phi_{H1}$ and $\phi_{H2}$. An output amplifier section 9, which is composed of the diffusion area 10 and field-effect-transistor (FET) amplifier 11, amplifies the charge from the gate 8 and is reset by a reset signal $\phi_R$. The output $V_{OUT}$ of amplifier section 9 is a PAM signal as shown in FIG. 3K. In the figure, $V_{DR}$ and $V_D$ represent drive voltages for FETs.

Figure 3A:
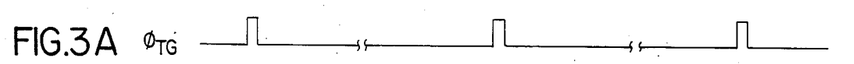
FIGS. 3A to 3K are waveform diagrams illustrating the operation of the CCD shown in FIG. 2.
Figures 3B, 3C:
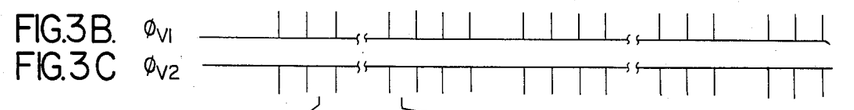
Figure 3D:
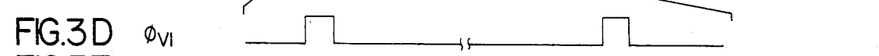
Figure 3E:
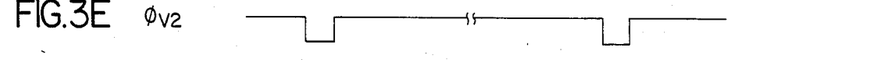
Figure 3F:
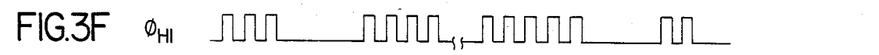
Figure 3G:
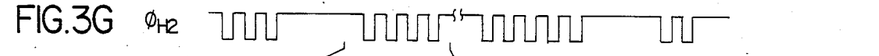
Figure 3H:
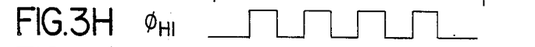
Figure 3I:
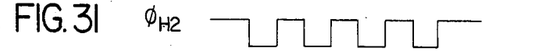
Figure 3J:
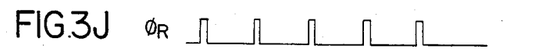
Figure 3K:
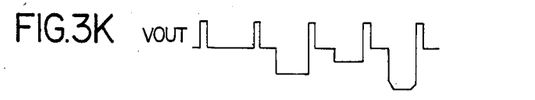

FIG. 3A shows a transfer signal $\phi_{TG}$; FIGS. 3B and 3C show transfer clock pulses $\phi_{V1}$ and $\phi_{V2}$; FIGS. 3D and 3E, the transfer clock pulses $\phi_{V1}$ and $\phi_{V2}$ of FIGS. 3B and 3C on an enlarged scale; FIGS. 3F and 3G, the transfer clock pulses $\phi_{H1}$ and $\phi_{H2}$; FIGS. 3H and 3I, the transfer clock pulses $\phi_{H1}$ and $\phi_{H2}$ of FIGS. 3F and 3G on an enlarged scale; FIG. 3J, the reset signal $\phi_R$; and FIG. 3K, the output voltage $V_{OUT}$.

Figure 4:
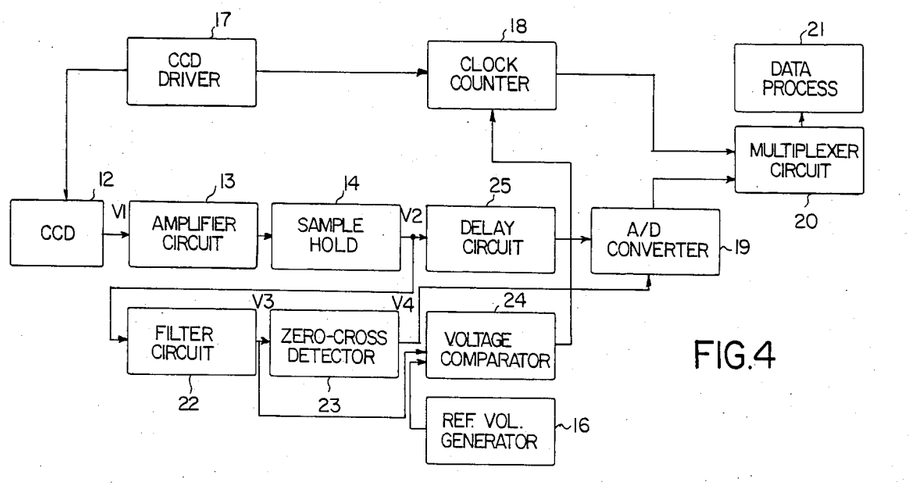
FIG. 4 is a block diagram illustrating one preferred embodiment of the star sensor of the invention.
Figure 5A:
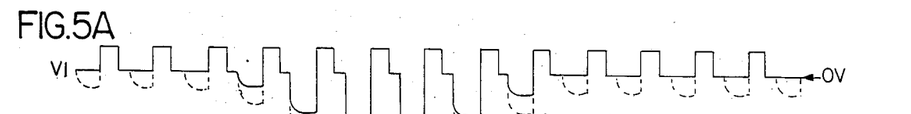
FIGS. 5A to 5D are waveform diagrams illustrating the operation of the star sensor shown in FIG. 4.
Figure 5B:
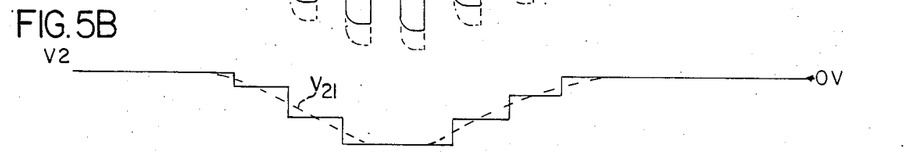

Referring to FIG. 4, the output signal $V_1$ of a CCD 12 (See FIG. 5A), after being amplified by an amplifier circuit 13, is supplied to a sample-and-hold circuit 14 to become a signal $V_2$ (FIG. 5B). The signal $V_2$ is then caused to pass through a fixed delay circuit 25 and is converted into a digital signal at an A/D converter 19 controlled by a zero-crossing detector circuit 23, which will be described below. The digitized signal is supplied to a multiplexer circuit 20 together with the positional information of the pels at the time this signal was obtained, i.e., the coordinate (position relative to the axis of light beam) information of the star obtained by counting with a clock counter 18 clock pulses from a CCD driver circuit 17. The multiplexer circuit 20 provides in multiplexed form the positioned information of pels supplied from the clock counter circuit 18 and the digital signal supplied from the A/D converter circuit 19. The multiplexed signal is then fed to an on-board data processor circuit 21 at the next stage, wherein prescribed processing is achieved.

Next, a characteristic part of the present invention will be described. A filter circuit 22 comprises a lowpass filter (LPF) and a high-pass filter (HPF) (neither illustrated). From the output signal $V_2$ coming from the CCD 12 via the sample-and-hold circuit 14, first the LPF provides a signal $V_{21}$ shown in FIG. 5B, and then the HPF, the signal $V_3$ shown in FIG. 5C. The latter is supplied to a zero-crossing detector circuit 23 which detects the zero-crossing point of the output signal $V_3$ to provide an output $V_4$ to the A/D converter 19. As is evident from FIG. 5C, the zero-crossing point occurs at a location corresponding to three pels after the pel manifesting the highest output. The output $V_4$ triggers the A/D converter 19 to convert the signal $V_2$, that is delayed by three bits by the delay circuit 25, into a digital signal. Therefore, the signal thus digitized indicates the peak value of the signal $V_2$ and is supplied to the multiplexer circuit 20.

Figure 5C:
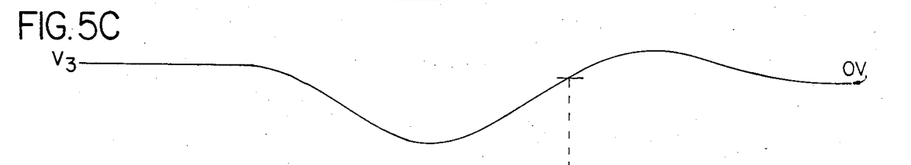
Figure 5D:
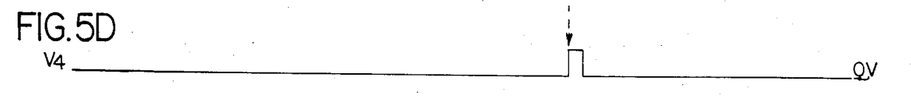

The output signal $V_3$ of filter circuit 22 is also supplied to the voltage comparator 24 with which the signal $V_3$ is compared with a reference voltage that is supplied from a reference voltage generator 16 and corresponds to the predetermined magnitude of a star. When the voltage value of the signal $V_3$ exceeds the reference voltage, the comparator 24 provides a control signal to enable the clock counter circuit 18 to supply the multiplexer circuit 20 with its output, i.e., the positional information of CCD image.

Thus, the data processor circuit 21 is supplied from the A/D converter 19 with the digitized peak value of one horizontal sequence of pels of the CCD image and from the clock counter circuit 18 with the positional information behind the peak value by three bits. The positional information can be made the information of the peak value by simply counting down or up by the delay the value supplied from the counter circuit 18.

Receiving a peak value and its positional information from every one of the horizontal and vertical sequences of pels, the data processor circuit 21 accurately determines the brightness and position of the star. The quantity of data to be memorized need not be greater than one each of horizontal and vertical sequences around the star image on the CCD. In other words, it is sufficient to store, for instance, 10 pieces of data as in FIGS. 9A and 9B, which will be described later. Furthermore, the control signal from the comparator circuit 24 is generated on the basis of a signal having passed through the filter circuit 22. Therefore, the star image detection is not adversely affected by background light or the dark current fluctuation of the CCD. Background light rays, which are uniformly superimposed on the desired signal, for instance like the dotted lines in FIG. 5A, are removed by the function of the HPF in the filter circuit 22. The dark current fluctuation is also eliminated by the filter circuit 22.

Figure 6:
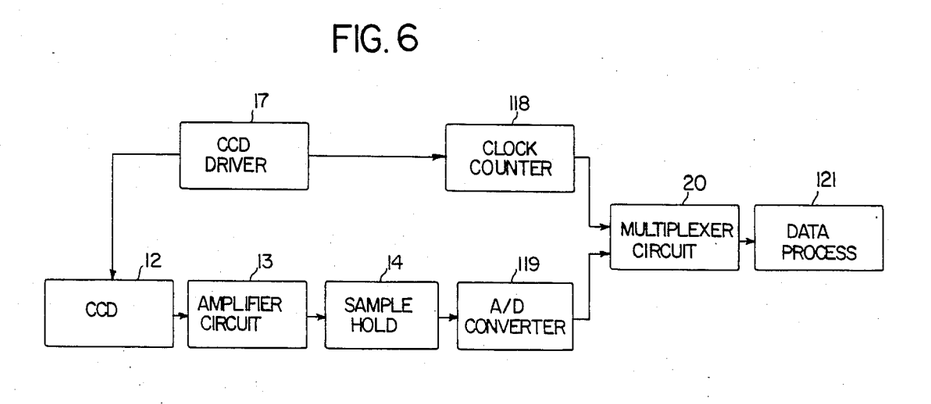
FIG. 6 is a block diagram illustrating another preferred embodiment of the star sensor according to the invention.

Referring now to FIG. 6, a clock counter circuit 118 and an A/D converter 119, unlike their respective counterparts in the embodiment illustrated in FIG. 4, sequentially supply the star image data and the positional information from time to time, respectively, to a data processor circuit 121 by way of a multiplexer circuit 20. The data processor circuit 121 memorizes a column or a row from the horizontal or vertical sequences of pels of the CCD 12, executes on the basis of this data the same algorithm as the filter circuit 22 and the zero-crossing detector 23 in the embodiment shown in FIG. 4, and thereby detects the brightness and position of the star image.

Figure 7:
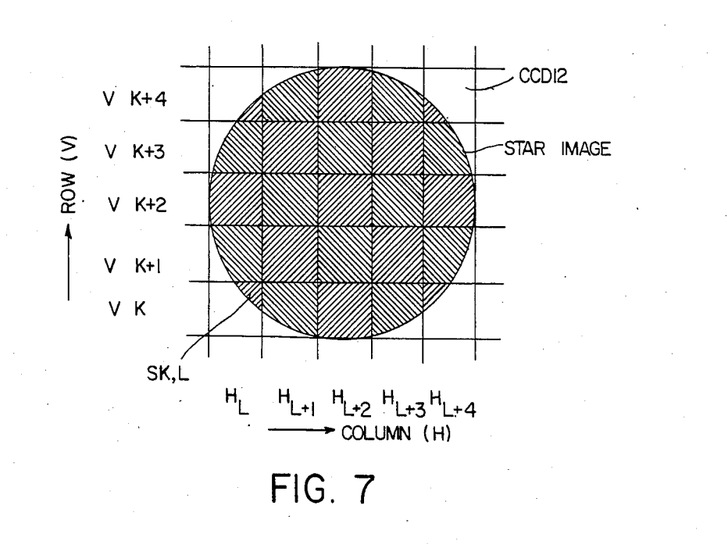
FIG. 7 is a mapping plan of the CCD shown to describe the star sensor of FIG. 6.

Next, the operation of the star sensor of FIG. 6 will be described in detail with reference to FIGS. 7 and 8A to 8F. In FIG. 7, which illustrates the image of a star formed on the CCD 12, the addresses of pels in the horizontal (H) direction are designated as $H_L$, $H_{L+1}$, $H_{L+2}$ and so on, and those in the vertical (V) direction, as $V_K$, $V_{K+1}$, $V_{K+2}$ and so on. It is seen that the center of the star image has the address of $(H_{L+2}, V_{K+2})$. The output level of each pel is represented by $S_{K,L}$ and so forth. The position and brightness of the star to be determined are the values at $(H_{L+2}, V_{K+2})$ and $S_{K+2, L+2}$, respectively.

They are obtained in the following flow:

(1) The data are edited on the $V_K$ line. Thus, the addresses and outputs of pels in FIG. 7 are rearranged as in FIG. 8A. If the input has a uniform background, it is represented by an increase or a decrease of the offset from the "0" level shown in FIG. 8A.

Figure 8A:
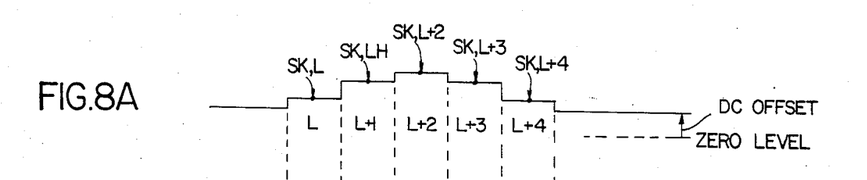
FIGS. 8A to 8F are waveform diagrams showing the star sensor of FIG. 6.
Figure 8B:
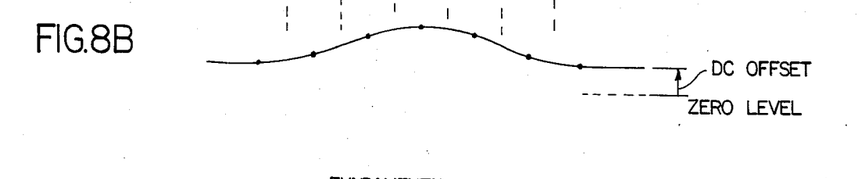

(2) Data are interpolated into the $V_K$ line. Thus, as shown in FIG. 8B, the rearranged pels are interpolated between them to provide a suitable function.

Figure 8C:
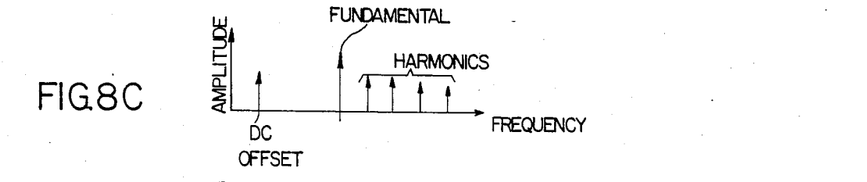

(3) The function interpolated into the $V_K$ line is transformed into a frequency domain by fast Fourier transform (FFT). Thus, as shown in FIG. 8C, there are obtained in frequency domain a fundamental, harmonics and D.C. components corresponding to a uniform background.

Figure 8D:
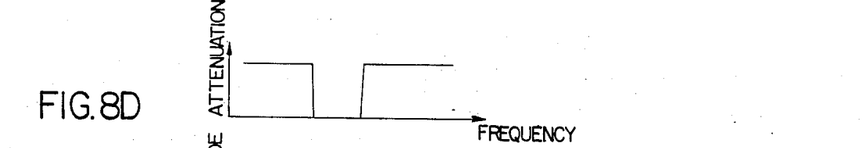
Figure 8E:
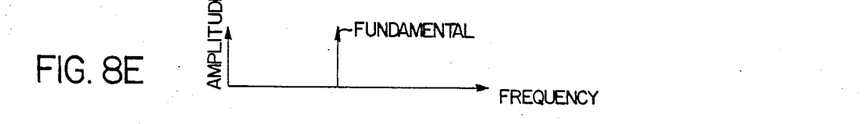

(4) Filtering is achieved in frequency domain. Thus, filtering is so effected as to pass only the fundamental frequency component shown in FIG. 8C. The frequency characteristic of filtering is shown in FIG. 8D. The output after the filtering is illustrated in FIG. 8E.

Figure 8F:
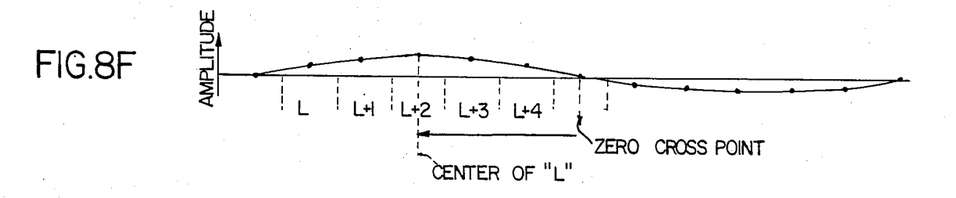

(5) The output filtered with respect to the $V_K$ line is transformed into time domain by inverse fast Fourier transform (IFET). Thus, as shown in FIG. 8F, the waveform in time domain is obtained.

(6) The center of L is determined from the waveform transformed into the time domain. Thus, the zero-crossing point is determined from the waveform of FIG. 8F, and the central position of L is determined. The address $L+2$ and the level $S_{K, L+2}$ are memorized.

Figure 9A:
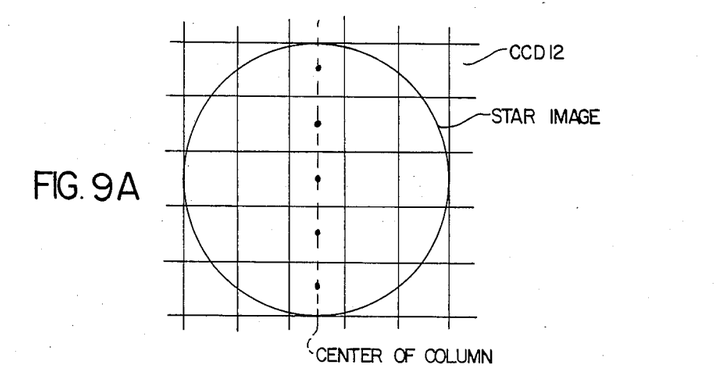
FIGS. 9A and 9B are mapping plans of the CCD shown to describe the star sensor of FIG. 6.

The processing of the $V_K$ line has been described above. The $V_{K+1}$, $V_{K+2}$ . . . lines are similarly processed. FIG. 9A shows the result of the processing of the $V_K$, $V_{K+1}$ . . . lines.

Figure 9B:
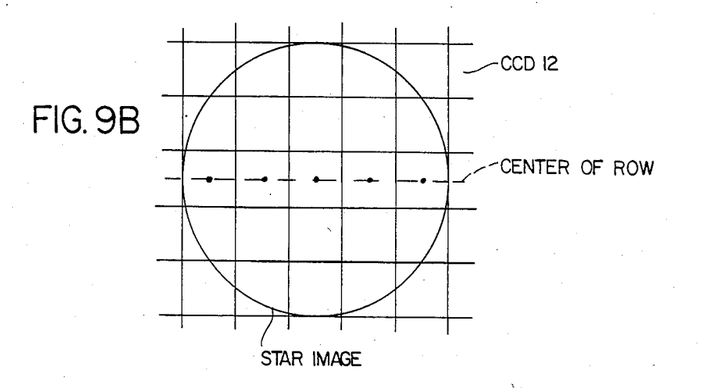

Next, the processing illustrated in FIGS. 8A to 8F is applied to the $H_L$, $H_{L+1}$ . . . column in the same way as to the V lines to obtain the result shown in FIG. 9B. On the basis of the crossing points of the broken lines in the results thereby obtained, shown in FIGS. 9A and 9B, the center of the star image focused on the CCD is determined, as illustrated in FIG. 7. The level at this address is also read out.

What is claimed is:

1. A star sensor comprising:
   CCD means for detecting the light rays of a star and for producing an output representative of the intensity distribution of said light rays at various points of said CCD means;
   means for counting clock pulses with which said CCD means is driven;
   means for filtering said output of said CCD means to produce an envelope signal representative of an envelope component thereof, said envelope signal having a zero crossing point;
   means for detecting the zero-crossing point of said envelope signal to produce a detecting means output; and
   computing means responsive to the output of said detecting means and to the output of said counting means for proving a signal representative of the position of said star.

2. A star sensor, as in claim 1, wherein said filtering means comprises a low-pass filter for providing a low frequency component of said output of said CCD means and a high-pass filter for providing a high frequency componnt of said output of said CCD.

3. A star sensor, as in claim 1, wherein said counting means comprises counter means for counting said clock pulses to provide a count result responsive to a control signal, and wherein said computing means comprises:
   comparator means for comparing the output of said filtering means with a reference voltage to provide said control signal to said counter means when said output of said detecting means exceeds said reference voltage;
   peak value supplying means for digitizing the output of said CCD to provide a peak value digitized output in response to the output of said detecting means; and
   data processor means for calculating the brightness of said star from said peak value and the position of said star from said count result of said counter means.

4. A star sensor, as in claim 3, wherein said peak value supplying means comprises means for delaying the output of said CCD by a prescribed number of bits and analog-to-digital converter means for digitizing said delayed output of said CCD and supplying said digitized output to said data processor means in response to the output of said detecting means.

5. A star sensor, as in claim 4, further including, between said CCD and said delaying means, for amplifying the output of said CCD means and sample-and-hold circuit means for sampling and holding the output of said amplifying means for supply to said delaying means and to said filtering means.

6. A star sensor comprising:
   CCD means for detecting the light rays of a star and for producing an output representative thereof;
   analog-to-digital converter means responsive to a first control signal for converting said output of said CCD means into a digital signal output;
   means for filtering the output of said CCD means to extract an envelope signal having a zero-crossing points attributable to light intensity variations of said star;
   means for detecting and for generating an output representative of the points where said envelope signal has its said zero-crossing points and for supplying a detection signal to said analog-to-digital converter means as said first control signal;
   means for supplying said CCD means with clock pulses;
   counter means for counting said clock pulses and for providing a count result output responsive to a second control signal;
   comparator means for comparing the output of said filtering means and a reference voltage and, if said output exceeds said reference voltage, supplying a comparator output comprising said second control signal to said counter means; and
   means responsive to said digital signal output of said analog-to-digital converter means and said count result output of said counter means for proivding signals representative of the brightness and position of said star.

7. A star sensor, as in claim 6, further including delaying means, coupled between said CCD means and said analog-to-digital converter means, for delaying said output of said CCD means by a prescribed time and for supplying said delayed output of said CCD means to said analog-to-digital converter means.

8. A star sensor, as in claim 7, wherein said prescribed time is the time from the point where said level equals said predetermined level to a peak level point representing the brightness of said star.

9. A star sensor, as in claim 7, including means for amplifying the output of said CCD means; said amplifying means being positioned between said CCD means, and said delaying means and filtering means; and further including means for sampling and holding the output of said amplifying means for supply to said delaying means and said filtering means.

10. A star sensor, as in claim 9, wherein said filtering means comprises low-pass filter means for providing a low frequency component of said sampling and holding means and high-pass filter means for providing a high frequency component of said sampling and holding means.

11. A star sensor, as in claim 6, wherein said reference voltage corresponds to the brightness magnitude of said star.

12. A star sensor, as in claim 6, wherein said predetermined level is a zero volts level.

13. A star sensor comprising:
   CCD means including a plurality of spacially distributed light sensing elements for detecting light rays of a star, each of said elements producing a respective output having a magnitude which is proportional to the brightness of said light rays impinging thereon;
   means for filtering the outputs of said elements to produce an envelope signal thereof;
   means for detecting a zero-crossing point of said envelope signal;
   means responsive to said zero-crossing point for identifying the location of a center element whose output is representative of the brightest of said light rays; and
   computing means for determining the directional position and brightness of said star from said location and said output of said other elements.

14. A star sensor, as in Claim 13, wherein:
   (a) said CCD means include:

(1) a CCD device for detecting said light rays;
(2) a sample and hold device for receiving and holding said output of said CCD device; and
(3) a CCD driver for driving said CCD device with clock pulses, (b) said star sensor further comprises;
(1) comparator means responsive to said zero crossing detector output;
(2) a reference voltage generator output connected to said comparator means, said comparator further including an output which is active when said detector output exceeds said reference generator output to produce clock pulses.
(3) counter means for counting said clock pulses to produce a count result;
(4) a delay circuit for providing delayed outputs from said sample and hold device; and
(5) an A/D converter for digitizing said delayed outputs of said sample and hold circuit, and (c) said computing means comprise means responsive to said count result and said A/D converter for computing said directional position and brightness of said star.

15. A star sensor as in claim 13, wherein said filtering means, said detecting means, said means for identifying the locations of said other elements and said computing means comprises a data processing computer and wherein said CCD means comprises a CCD device and a sample and hold device for receiving and holding said output of said CCD device.

16. A star sensor as in claim 15, wherein said filteirng means comprises:

(a) means for transforming at least a portion of said output of said CCD means into a frequency domain output by fast Fourier transform (FFT);
(b) means for removing non-fundamental frequencies from said frequency domain output to produce a filtered output; and
(c) means for transforming said filtered output to a time domain signal by inverse fast Fourier transform.

* * * * *